United States Patent
Cau et al.

[15] 3,660,224
[45] May 2, 1972

[54] METHOD FOR MAKING ADHERE TO EACH OTHER CURED LAYERS OF EPM OR EPDM ELASTOMERS AND/OR BUTYL RUBBER AND PRODUCTS THUS OBTAINED

[72] Inventors: Pasqualino Cau, Oggiono; Ermes Anelli, Milan, both of Italy

[73] Assignee: The B. F. Goodrich Company, Akron, Ohio

[22] Filed: Jan. 30, 1970

[21] Appl. No.: 7,217

[30] Foreign Application Priority Data

Feb. 3, 1969 Italy ................................ 12354 A/69
Sept. 10, 1969 Italy ................................ 21833 A/69

[52] U.S. Cl. ........................ 161/252, 156/110 A, 156/309, 156/311, 156/334
[51] Int. Cl. ........................ B27b 27/08, B29h 5/02
[58] Field of Search ........ 156/110 R, 110 A, 309, 311, 156/334

[56] References Cited

UNITED STATES PATENTS

| | | | |
|---|---|---|---|
| 3,114,409 | 12/1963 | Iknayan et al. | 156/309 X |
| 3,540,979 | 11/1970 | Hughes | 161/252 |
| 3,551,284 | 12/1970 | Portolani | 156/334 UX |
| 3,522,831 | 8/1970 | Torti et al. | 161/252 X |

FOREIGN PATENTS OR APPLICATIONS

| | | | |
|---|---|---|---|
| 538,043 | 3/1967 | Canada | 156/311 |
| 846,218 | 8/1960 | Great Britain | 156/309 |
| 656,599 | 12/1964 | Belgium | 161/252 |

*Primary Examiner*—Leland A. Sebastian
*Attorney*—J. Hughes Powell, Jr. and Ernest K. Bean

[57] ABSTRACT

The present invention relates to a process for making adhere or for welding together layers or shaped articles such as plates, sheets, tube-tires, and the like, based on cured synthetic elastomers chosen from among the group including: copolymers and/or terpolymers of ethylene, of an alpha-olefine and optionally of a polyene, (for example EPM and EPDM rubber), and/or butyl rubber, by interposing between the layers to be caused to adhere a plastomeric layer consisting of thermoplastic polymers and/or copolymers, free of polar substituting groups or of reactive groups, of ethylene, propylene and/or butene, and by the successive heating under pressure of the associated layers.

7 Claims, No Drawings

METHOD FOR MAKING ADHERE TO EACH OTHER CURED LAYERS OF EPM OR EPDM ELASTOMERS AND/OR BUTYL RUBBER AND PRODUCTS THUS OBTAINED

DESCRIPTION OF THE INVENTION

The present invention relates to a process for making adhere or for welding together layers or shaped articles such as plates, sheets, tube-tires, and the like, based on cured synthetic elastomers chosen from among the group including: copolymers and/or terpolymers of ethylene, of an alpha-olefine and optionally of a polyene, (for example EPM and EPDM rubber), and/or butyl rubber, by interposing between the layers to be caused to adhere a plastomeric layer consisting of thermoplastic polymers and/or copolymers, free of polar substituting groups or of reactive groups, of ethylene, propylene and/or butene, and by the successive heating under pressure of the associated layers.

The invention comprises also the coupled articles and bodies consisting of cured layers of olefinic copolymers and/or terpolymers, and/or butyl rubber joined to each other by means of thermoplastic polymers and/or copolymers of ethylene, propylene and/or butene.

The problem of obtaining an efficient adhesion between the vulcanized elastomers, resisting to loading and temperature stresses, to the contact with chemical agents, is of particular importance, for instance, in the preparation of impermeable layers of great size starting from small-sized elastomeric layers; said large-sized layers turn out to be useful, for instance, for the covering of terraces, floors, for the lining of tanks, pools and artificial lakes.

As well in the field of tires, in particular in the manufacture of inner tubes for tires where, owing to its very low permeability to gases, butyl rubber is largely used.

In the Prior Art are quite known the synthetic elastomeric products formed by saturated copolymers of ethylene with alpha-olefines or with a low degree of unsaturation due to a third polyenic comonomer; in particular this is the case of copolymers of ethylene with propylene or with butene, or respectively of ethylene with a propylene (or butene) and a cyclic or acyclic non-conjugated diene or triene, which are produced with the help of suitable catalytic systems based on compounds of transition metals and metalorganic compounds and which may be vulcanized by means of different methods, in particular with organic peroxides associated with free radical acceptors. Butyl rubber is also well known.

Said saturated or with a low grade of insaturation elastomeric products are characterized by a prevailingly amorphous structure free or almost free of substituent groups of polar character or of reactive points, which structure if on the one hand confers to the vulcanized products an excellent resistance to aging and to chemical agents, on the other hand makes their adhesion extremely difficult.

To the Prior Art are known processes for the adhesion to eachother of synthetic elastomers of the above described type. In general the jointings were obtained by using adhesive compositions in the form of pastes, emulsions or solutions in suitable solvents. Such adhesives were, for instance, based on epoxy resins, phenolformaldehyde resins, natural rubbers or synthetic rubbers such as halogenated butyl rubber, on acrylonitrile butadiene copolymers. These adhesives were applied to the surfaces to be joined either by spreading, or by spraying, in general before the vulcanization of the elastomeric product so that the adhesive properties could develop during the vulcanization.

The development of the adhesive properties could be obtained besides with the application of heat also with the simple elimination of the solvent eventually present or by the action of suitable activating agents incorporated into the adhesive.

The drawbacks of all the above mentioned coupling processes derive, for instance, from the fact that the adhesives had a limited conservation and it was necessary in certain cases to stabilize them. Furthermore, their formulation and their application were neither simple nor cheap, but, above all, it was impossible to obtain with their aid joints capable of satisfying any requirement in this field.

In addition to the above mentioned adhesives, the toroidal sealing of the butyl rubber tube tires, in the manufacture of inner tubes for tires (as well as their repairs), was achieved generally by curing. The adhesion method by curing involved the great drawback of requiring a remarkable period of time and therefore of being expensive.

The object of the present invention is that of remedying the drawbacks existing in the prior art and of obtaining in a simple, rapid and inexpensive way an efficient adhesion between cured synthetic elastomers.

It has now been surprisingly found that it is possible to obtain very high adhesion values between cured layers of elastomeric copolymers and/or terpolymers of ethylene with an alpha-olefine and, optionally, a polyene and/or butyl rubber, when between these elastomeric layers is interposed a plastomeric layer of thermoplastic polymers and/or copolymers, free of substituent groups with a polar character or of reactive groups, of ethylene, propylene and/or butene, and when they thus joined layers are subjected to the action of heat, preferably under pressure.

An advantage of this invention lies in the rapidity with which the joining can be achieved.

Another advantage consists in the fact that it is possible to use much smaller quantities of adhesive than that so far required for attaining an equivalent adhesion.

Still another advantage consists in the fact that the polymeric substances used as adhesives according to this invention are solid at room temperature, that they may be stably preserved for long stretches of time and may be manipulated without any danger that they developed their adhesive properties untimely or that they hardened, before their application, as would, on the contrary, be possible with the conventional adhesives.

A further advantage still lies in the fact that in most gases the solvent used before with the adhesive substances is eliminated.

Still another advantage lies, above all, in the fact that the joined bodies and articles, according to this invention, show superior adhesion characteristics which are capable of practically satisfying any requirement in this field.

According to this invention, the process for obtaining welded layers or formed articles such as plates, sheets tube-tires and the like, consisting of vulcanized elastomeric copolymers and/or terpolymers of ethylene, alpha-olefine an optionally a polyene, and/or butyl rubber is now characterized in that:

1. between the surfaces of the elastomeric layers to be brought to stick together is interposed a solid layer in the form of a film, ribbon or strips, or a molten layer of thermoplastic polymers, free of substituting groups with a polar character or of reactive groups, chosen from the group comprising plastomeric polymers and/or copolymers of ethylene, propylene and/or butene;
2. the layers are joined by exerting on them preferably a certain pressure that may vary from 0.2 to 4 kg/sq.cm.;
3. the joined layers are heated while they are under pressure, at temperatures sufficient to achieve a softening of the interposed plastomer, and for times comprised between 5 and 40 seconds, said temperature being preferably comprised between 20° below and 30° C above the melting point of said thermoplastic polymer;
4. the joined layers are cooled down to room temperature while keeping them still under pressure.

The plastomeric layer may be interposed by welding it in advance on at least one of the elastomeric layers to be caused to adhere.

The vulcanized elastomeric copolymers that are made to stick together are formed of ethylene and an alpha-olefine, preferably propylene or butene-1; they are saturated and amorphous and in general they have a molecular weight comprised between 50.000 and 800.000 and have a contents in combined monomeric units of ethylene of from 20 percent to 80 percent in moles.

A typical example of such copolymers is the "Dutral 33," commercial trade mark of Montecatini Edison S.p.A. for the amorphous ethylene-propylene copolymer.

The terpolymers to be joined consist of ethylene, an alpha-olefine, preferably propylene or butene-1, and a cyclic or acyclic polyene. Preferably said polyene is a non-conjugated diene and may be chosen, for instance, from amongst the following substances: dicyclopentadiene, cyclooctadiene, 1,4-hexadiene, 6-methyl-4,7,8,9-tetrahydroindene, ethylidennorbornene and the like.

Said terpolymers have a molecular weight comprised between 60.000 and 800.000, and they contain from 20 percent to 80 percent in moles of ethylene and from 0.1 percent to 20 percent in moles of diene.

Non-limiting examples of said terpolymers are the "Dutral Ter 0 35 E," trade mark of Montecatini Edison S.p.A. for the ethylene-propylene-ethylidene-norbornene terpolymer, and the "Dutral Ter 534 H" for the ethylene-propylene-6-methyl-4,7,8,9-tetrahydroindene terpolymer.

The above said elastomeric copolymers or terpolymers are commonly obtained in the presence of catalysts based on compounds of transition metals (especially vanadium) and on organic aluminum compounds, and are vulcanizable with systems based on sulphur and accelerators or on organic peroxide agents. According to an aspect of the present invention the elastomers to be caused to adhere include at least one layer of butyl rubber: the latter is on isobutylene-isoprene copolymer containing from 0.5 to 3 percent in moles of isoprene.

The thermoplastic polymers, free of substituting groups of polar character or of reactive groups surprisingly used in this invention, are chosen from amongst polypropylene essentially consisting isotactic macromolecules of a density comprised between 0.902 and 0.906 g/cc, high density polyethylene (0.941–0.945 g/cc), medium density polyethylene (0.926–0.940 g/cc), low-density polyethylene (0.910–0.925 g/cc) and plastomeric copolymers with partially crystalline heteroblocks of propylene with ethylene and/or butene with a density of from 0.896 to 0.899 g/cc.

An example of the plastomeric homopolymers to be used according to this invention, may be represented by the products of Montecatini Edison S.p.A., known under the trade names of "MOPLEN," especially "MOPLEN T 305" for the polypropylene, of "FERTENE" for the low-density polyethylene and of "Moplen-RO" for the high-density polyethylene.

For the plastomeric copolymers of propylene with ethylene and/or butene, there may be used partially crystalline thermoplastic products, also known by the name of "polyallomers" which contain blocks of monomeric units of the ethylene alternated with blocks of an isotactic structure of monomeric units of propylene and/or butene-1, a more detailed description of which may be found, for instance, in "Modern Plastic Encyclopaedia" — Oct. 1968, volume 45, n 14, pages from 252 to 253.

The welding plastomers of this invention in general are used in small quantities of from 2 to 20 mg, but preferably in quantities comprised between 5 and 15 mg per sq.cm. of adhering surface.

The adhesion obtained by using the thermoplastic polymers and/or copolymers of this invention, is so much more surprising as it was unexpectedly found that by using on the contrary thermoplastic polymers having substituting groups with a polar character or reactive groups such as, for instance, polyvinyl chloride, polystyrene or polyamides, it is not possible to obtain any adhesion.

The thermoplastic polymers and/or copolymers of this invention may be interposed between the surfaces to be brought to stick together either in the solid state, preferably in form of films, sheets, strips of various thicknesses, or in the molten state.

The joining operation of the layers under pressure and the development of the adhesive properties through heating, may be carried out either on discontinuously operating apparatus of the type of presses with heated plates, or on apparatus with continuous operation using heated coupling cylinders, or it may be carried out manually.

According to one form of embodiment of this invention, two vulcanized elastomeric sheets are continuously fed between two coupling, rolls, contemporaneously with a thermoplastic polymer and/or copolymer strip which is inserted between said sheets in the coupling zone.

The coupling rollers are both heated at temperature sufficient to soften the interposed strip.

The elastomer-plastomer-elastomer coupling thus obtained is kept under pressure and is cooled down to room temperature, for instance, by letting pass the above coupling between pressure rollers immersed in a cooling bath of water.

The plastomer may also be fed to the coupling rollers just as it comes out of the extruder, that is, in the molten state.

The welding operation may also be carried out manually without the use of special equipment. In such a case, use is made of already previously prepared elastomeric sheets on each of which there had been preliminary welded strips of thermoplastic polymer and/or copolymers.

The coupling of the sheets thus prepared is generally carried out on the spot where it is used, and it comprises the heating, for instance, by hot-air blowpipe, of the zones of the sheets on which are welded the thermoplastic strips, until reaching the softening point of the latter, and by then assembling the sheets together in such a way as to have the softened zone superimposed and in direct contact with eachother; on these is then exerted a manual pressure, for instance, by means of a pressure roller.

Thereby are obtained quite satisfactory couplings which can be realized in a very economical (cheap) way on the spot of use.

For manufacturing inner tubes for tires, it is possible to employ tubes made of cured butyl rubber, on one end of which a strip of plastomer is previously welded. The toroidal-shaped closing of the tubes thus prepared can be simply made by subjecting the contact zone to heating under pressure, for very short periods of time not exceeding 40 seconds.

For repairing butyl rubber tubes for tires, butyl rubber sheets can be prepared bearing a plastomer film welded on one surface, from which shaped pieces can be detached, which are then applied under heat and under pressure onto the surfaces to be repaired.

Some examples will now be given to illustrate the present invention, though without limiting the scope thereof.

EXAMPLES 1–11

There has been carried out a series of tests in which have been used elastomeric sheets for impermeabilizations, obtained through the vulcanization of a compound based on an amorphous ethylene-propylene copolymer, in particular the ethylene-propylene copolymer containing 55 55 60 percent by weight of propylene, additional with 25–30 percent by weight of an alkylbenzenic oil and having a Mooney viscosity ML (1 4) at 100 C of 30–40, which is produced by the Montcatini Edison S.p.A. under the trade name of "DUTRAL 33."

The composition of this compound was the following:

| | % b.w. |
|---|---|
| Ethylene-propylene copolymer containing 55% by weight of propylene and 25% by weight of alkyl-benzenic oil, and having an ML (1 4) viscosity at 100 C. of 35 | 100 |
| Carbonblack HAF | 20 |
| Carbonblack EPC | 30 |
| Calcium carbonate | 80 |
| Zinc oxide | 5 |
| Alkylbenzenic oil (Preadix 8) | 10 |
| Diphenylguanidine (DPG) | 2 |
| Sulphur | 0.35 |
| 1,1-diter-butyl-peroxy-3,5,5-trime- | | thyl-cyclohexane (Trigonox 29/40)  8.5

The sheets based on the above mentioned compound have been vulcanized continuously (rotocure) for 7 minutes at 160° C. The vulcanized sheets displayed the following mechanical characteristics:

|  | In the sense of the length | In the sense of the width |
|---|---|---|
| Tensile strength in kg./sq.cm | 85 | 75 |
| Elongation at break in % | 460 | 480 |
| Modules at 300%, in kg./sq.cm. | 43 | 35 |
| Hardness Shore A | 55 | 55 |

The vulcanized sheets have been superimposed on eachother after the interposition of high-density polyethylene films 20mm wide and with a variable thickness (e.g.: MOPLEN RO), the sheets being then introduced into a flat press where they were compressed and heated at 135° C for varying times. The layers thus assembled were then cooled down in the press to room temperature.

The high-density polyethylene film used showed the following characteristics:

| Melt index | 0.33 |
|---|---|
| Density, in g./sq.cm. | 0.9536 |
| Brittle point | −40° C. |
| Melting temperature | 135° C. |

By means of the above described welding process there was prepared a series of test specimen by varying the thickness of the interposed film, the pressure and the welding time, and more particularly there were used for the plastomer thicknesses of 0.05, 0.07 and 0.1, pressures of 0.5, 0.1 and 2 kg/sq.cm.; welding times of 10, 20 and 30 seconds.

On these test samples have been determined the adhesion values according to the ASTM D 413-39 Friction Test Machine Method. The results have been recorded on table 1.

The results obtained quite clearly evidence the validity of the adhesion system according to this invention; the coupling zones remained integral also after the tested aging periods.

EXAMPLES 12-22

There was prepared a series of test samples by operating in the same way as indicated in the group of examples from 1 to 11, but using low-density polyethylene films (e.g. Fertene) instead of high-density polyethylene films and using a welding temperature of 120° C instead of 135° C.

The low-density polyethylene film showed the following characteristics:

| Melt index | 1.3 |
|---|---|
| Brittle point | −50° C. |
| Melting temperature | 115°–120° C. |

On the test samples were then measured the adhesions according to what indicated in the example from 1 to 11. The results have been recorded on table 2.

EXAMPLES 23-33

Operating in the same way as indicated in the group of examples 1-11, there were prepared test samples by using polypropylene essentially consisting of isotactic macromolecules (e.g. "Moplen T 305") and by using a welding temperature of 175° C.

The characteristics of the polypropylene were:

| Melt index | 2.6 |
|---|---|
| Brittle point | 17° C. |
| Melting temperature | 167° C. |

The results of the adhesion tests have been recorded on table 3.

EXAMPLES 34-44

Operating in the same way as indicated in example from 1-11, there were prepared test samples by using plastomeric copolymers with ethylene-propylene heteroblocks and by using a welding temperature of 178° C.

The plastomeric copolymers with ethylene-propylene heteroblocks showed the following characteristics:

| Melt index | 2.2 |  |
|---|---|---|
| Brittle point |  | −22° C. |
| Ethylene, % by weight | 10,8 |  |
| Melting temperature |  | 176° C. |
| Flexional rigidity | 13400 |  |
| Resilience (with notch) at 0° C. | 8,8 |  |

The results of the adhesion tests have been recorded on table 4.

EXAMPLES 45-51

There were carried out welding tests, according to the operational procedures indicated in examples 1-11, on sheets for pavings, obtained through the vulcanization in a plate press at 160° C for 30 minutes of a compound based on ethylene-propylene-diene terpolymers, in particular ethylene-propylene-ethylidene-norbornene terpolymer, containing 30 percent to 40 percent in moles of ethylene, 0.5 5 percent in moles of diene and having a Mooney ML(1+4) viscosity at 100° C of 5060, produced by Montecatini Edison S.p.A. under the trade name of "DUTRAL TER 0 35 E," and on ethylene-propylene-6-methyl-4,7,8,9-tetrahydroindene terpolymer, containing from 30 percent to 40 percent in moles of ethylene, 0.55 percent in moles of diene and 50 percent by weight of an alkylbenzenic oil, and having a Mooney ML(1+4) viscosity at 100° C of from 4050 (produced by Montecatini Edison S.p.A. under the trade name of "DUTRAL TER 534 H"). The composition of the compound was the following:

|  | % by weight: |
|---|---|
| Terpolymer ethylene(35% in moles), propylene, ethylidenenorbornene (3.4% in moles) having an ML(1+4) viscosity at 100° C. of 55 | 50 |
| Ethylene(35% in moles), propylene, 6-methyl-4,7,8,9-tetrahydroindene (3% in moles) terpolymer containing 50% by weight of alkylbenzenic oil having an ML(1+4) viscosity at 100° C. of 45 | 100 |
| Carbon black FEF | 150 |
| Zinc oxide | 5 |
| Stearic acid | 1 |
| Alkylbenzenic oil("Preadix 8") | 30 |

|  | % by weight: |
|---|---|
| Tetramethylthiuram-monosulphide (TMTMS) | 1.5 |
| Mercaptobenzothiazol (MBT) | 0.75 |
| Sulphur | 1.50 |

The vulcanized sheets had the following mechanical characteristics:

| Tensile strength in kg./sq.cm. | 154 |
|---|---|
| Elongation at break, in % | 260 |
| Modules at 200%, in kg./sq.cm. | 132 |
| Shore A hardness | 80 |

For the welding were used films based respectively on copolymers with partially crystalline heteroblocks of ethylene and propylene, propylene essentially formed by isotactic macromolecules, high-density polyethylene, rigid PVC, polystyrene and nylon.

The adhesion results obtained showed that by using in the welding of films of polymers having substituent groups of a polar character or reactive groups, such as PVC, polystyrene and nylon; no measurable adhesions are obtained.

EXAMPLE 52

A welding test was carried out, wherein elastomeric sheets obtained by curing a compound based on butyl rubber (isobutylene-isoprene copolymer), more particularly the "Enjay Butyl 215" rubber, were employed.
The compositions of the compound was as follows:

| | parts by weight |
|---|---|
| Enjay Butyl 215 | 100 |
| Carbon black FEF | 75 |
| ZnO | 5 |
| Stearic acid | 1 |
| N-phenyl-N$^1$-cyclohexyl-p-phenilene diamine | 1,5 |
| Petrolatum | 5 |

| | parts by weight |
|---|---|
| Paraffin wax | 6 |
| Tellurac(Tellurium diethyl dithiocarbonate) | 3 |
| Sulphur | 1,5 |

The sheets based on the aforesaid compound were cured in a press for 50 minutes at 150° C. The cured sheets had the following mechanical characteristics:

| | | |
|---|---|---|
| Tensile strength | kg./cm.$^2$ | 105 |
| Elongation at break | % | 470 |
| Modulus at 200% | kg./cm.$^2$ | 65 |
| Modulus at 300% | kg./cm.$^2$ | 85 |
| Residual deformation at 200% | % | 13 |
| Shore A Hardness | | 65 |

The cured sheets were placed one on top of the other after interposition of 20 mm wide and 0.05 mm thick high density polyethylene films (e.g. "Moplen RO") and then introduced into a flat press where they were compressed at 0.5 Kg/cm.$^2$ and heated up to 135° C for 20 seconds.

The high density polyethylene film employed in the welding had the following characteristics:

| | |
|---|---|
| Melt index | 0,33 |
| density, G/cm.$^3$ | 0.9536 |
| brittle point | −40 |
| melting temperature | 135° C. |

The adhesion values were determined on the welded samples according to the Friction Test Machine Method ASTM D413-39. The results, which are reported in Table 6, show the positiveness of the adhesion system according to the present invention; the jointing zones remain intact even after the experimented ageing periods.

EXAMPLE 53

Samples were prepared operating exactly like in Example 52 but using low density polyethylene films (e.g. "Fertene"), instead of high density polyethylene films and a welding temperature of 120° C instead of 135° C.

The low density polyethylene film had the following characteristics:

| | |
|---|---|
| Melt index | 1,3 |
| Brittle point | −50° C. |
| Melting temperature | 115120° C. |

The adhesion values were measured on the samples according to the indications of example 1. The results are reported in Table 6.

EXAMPLE 54

Operating exactly like in Example 52, samples were prepared using polypropylene, which essentially consisted of isotactic macromolecules (e.g. "Moplen T 305"), and a welding temperature of 175° C.

The characteristics of the polypropylene were as follows:

| | | |
|---|---|---|
| Melt index | 2,6 | |
| Brittle point | | + 17° C. |
| Melting temperature | | 167° C. |

The results of the adhesion tests are reported in Table 6.

EXAMPLE 55

Operating like in example 52, samples were prepared using films of plastomeric copolymers with ethylene-propylene heteroblocks and a welding temperature of 178° C.

The plastomeric copolymer with ethylene-propylene heteroblocks had the following characteristics:

| | | |
|---|---|---|
| Melt index | 2,2 | |
| Brittle point | | − 22° C. |
| Ethylene % by weight | 10,8 | |
| Melting temperature | | 176° C. |
| Flexural rigidity | 13400 | |
| Resilience (with notch) at 0° C. | 8.8 | |

The results of the adhesion tests are reported in table 6.

EXAMPLES 56–59

Tests were carried on to weld sheets of cured butyl rubber of the type described in example 52 to cured sheets based on ethylene-propylene-diene terpolymers, in particular based on the ethylene, propylene, ethylidene-norbornene terpolymer ("Dutral Ter 0 35 E," commercial name of Montecatini Edison S.p.A. and the ethylene, propylene, 6-methyl-4-7-8-9-tetrahydroindene terpolymer ("Dutral Ter 534 H," commercial name of Montecatini Edison S.p.A.).

The composition of the compound based on terpolymers was as follows:

| | PP |
|---|---|
| Terpolymer ethylene(35 mols%), propylene, ethylidene-norbornene(3,4 mols%) having a ML viscosity (1+4) (100° C. of 55 | 50 |
| Terpolymer ethylene(35 mols%), propylene, 6-methyl-4,7,8,9-tetrahydroindene (3 mols%) containing 50% by weight of alkyl benzene oil having an ML viscosity (1+4) 100° C. of 45 | 100 |
| Carbon black FEF | 150 |
| Zinc oxide | 5 |
| Stearic acid | 1 |
| Alkyl benzene oil("Preadix 8") | 30 |
| Tetramethyl-thiuram-monosulfide (TMTMS) | 1,5 |
| Mercaptobenzothiazol (MBT) | 0,75 |
| Sulphur | 1,50 |

The compound was cured for 30 minutes at 160° C. The cured sheets had the following mechanical characteristics:

| | | |
|---|---|---|
| Tensile strength | kg./cm.$^2$ | 154 |
| Elongation at break | % | 260 |
| Modulus at 200% | kg./cm.$^2$ | 132 |
| Shore A Hardness | | 80 |

The welding was performed with films based on high and low density polyethylene, polypropylene consisting essentially of isotactic macromolecules, and copolymers of propylene with ethylene having partially crystalline heteroblocks.

The results, which are reported in Table 7, show the positiveness of this adhesion system as far as butyl rubber and olefinic terpolymers are concerned.

TABLE 1

Adhesion between sheets based on ethylene-propylene copolymers with interposed high-density polyethylene

| | | Coupling conditions | | | | Adhesion values determined according to ASTM D423-39 rules in kg./cm. | | | | | | | |
|---|---|---|---|---|---|---|---|---|---|---|---|---|---|
| | Interposed material | | | | | | 1 hr. at 50° C. in an oven drawing at 50° C. | 1 hr. at 100° C. in an oven drawing at 100° C. | 2 days at 100° C. in an oven | | 2 days at 100° C. in $H_2O$ | | 5 days in $H_2O$ at 23° C. | 1 hr. at −30° C. drawing at −30° C. |
| Test No. | Type | Size in mm. | Pressure in kg./cm.² | Time in sec. | Temperature in ° C. | Untreated sample | | | Drawing at 100° C. | Drawing at 23° C. | Drawing at 100° C. | Drawing at 23° C. | | |
| 1 | High-density polyethylene | 20 x 0.05 | 0.5 | 10 | 135 | 2.9 | 2.5 | 2.1 | 2.0 | 1.9 | 2.8 | 2.7 | 2.8 | |
| 2 | do | 20 x 0.05 | 1 | 10 | 135 | 2.9 | 2.8 | 2.5 | 2.7 | 2.5 | 2.6 | 3.2 | 3.0 | |
| 3 | do | 20 x 0.05 | 2 | 10 | 135 | 3.1 | 2.9 | 2.4 | 2.5 | 3.2 | 3.1 | 3.1 | 3.2 | 4.5 |
| 4 | do | 20 x 0.1 | 0.5 | 10 | 135 | 3.4 | 3.2 | 2.9 | 3.1 | 3.3 | 3.1 | 3.1 | 3.4 | |
| 5 | do | 20 x 0.1 | 1 | 10 | 135 | 3.3 | 2.8 | 2.6 | 2.8 | 3.2 | 3.3 | 3.5 | 3.4 | 5.6 |
| 6 | do | 20 x 0.1 | 2 | 10 | 135 | 3.1 | 3.2 | 2.7 | 2.8 | 3.3 | 2.3 | 2.8 | 3.2 | |
| 7 | do | 20 x 0.07 | 0.5 | 10 | 135 | 3.1 | 3.0 | 2.3 | 2.8 | 3.1 | 2.8 | 3.2 | 3.4 | |
| 8 | do | 20 x 0.07 | 0.5 | 20 | 135 | 3.1 | 3.0 | 2.7 | 2.8 | 3.0 | >3.1 | 2.7 | 3.2 | 5.7 |
| 9 | do | 20 x 0.07 | 0.5 | 30 | 135 | 2.9 | 2.6 | 2.4 | 2.8 | 3.1 | >3.2 | >3.0 | 3.2 | |
| 10 | do | 20 x 0.07 | 1 | 10 | 135 | 3.1 | 2.8 | 3.0 | >2.9 | 3.0 | >2.9 | 2.7 | 3.4 | |
| 11 | do | 20 x 0.07 | 2 | 10 | 135 | >3.1 | >3.1 | 2.7 | >2.8 | >3.4 | 3.2 | >3.2 | >3.2 | |

NOTE.—Sign > stays to indicate that at the specified value there occurred the breakage of the compound.

TABLE 2

Adhesion between sheets based on ethylene-propylene copolymers with interposition of low-density polyethylene

| | | Coupling conditions | | | | Adhesion values determined according to ASTM D423-39 rules in kg./cm. | | | | | | | |
|---|---|---|---|---|---|---|---|---|---|---|---|---|---|
| | Interposed material | | | | | | 1 hr. at 50° C. in an oven drawing at 50° C. | 1 hr. at 100° C. in an oven drawing at 100° C. | 2 days at 100° C. in an oven | | 2 days at 100° C. in $H_2O$ | | 5 days in $H_2O$ at 23° C. | 1 hr. at −30° C. drawing at −30° C. |
| Test No. | Type | Size in mm. | Pressure in kg./cm.² | Time in sec. | Temperature in ° C. | Untreated sample | | | Drawing at 100° C. | Drawing at 23° C. | Drawing at 100° C. | Drawing at 23° C. | | |
| 12 | Low-density polyethylene | 20 x 0.05 | 0.5 | 10 | 120 | 2.6 | 2.3 | 1.75 | 0.5 | 1.5 | 2.8 | >2.9 | 2.9 | |
| 13 | do | 20 x 0.05 | 1 | 10 | 120 | 2.1 | 2.1 | 2.1 | 0.7 | 1.7 | 2.0 | 2.7 | 2.7 | |
| 14 | do | 20 x 0.05 | 2 | 10 | 120 | 2.9 | 1.9 | 0.9 | 0.5 | 1.7 | 2.0 | 2.8 | 2.6 | |
| 15 | do | 20 x 0.1 | 0.5 | 10 | 120 | 3.3 | 3.3 | 0.5 | 1.5 | >2.8 | 3.0 | >2.0 | 3.5 | |
| 16 | do | 20 x 0.1 | 1 | 10 | 120 | 2.5 | 2.5 | 0.4 | 0.8 | >2.8 | >3.0 | >2.6 | >3.2 | |
| 17 | do | 20 x 0.1 | 2 | 10 | 120 | 2.5 | 2.5 | 0.4 | 0.9 | 2.8 | 2.5 | 3.0 | 3.0 | |
| 18 | do | 20 x 0.07 | 0.5 | 10 | 120 | 2.8 | 2.7 | 0.5 | 1.1 | 2.3 | 2.5 | 3.0 | 3.3 | |
| 19 | do | 20 x 0.07 | 0.5 | 20 | 120 | 2.8 | 2.7 | 1.2 | 1.1 | 2.3 | 2.9 | >3.1 | 3.3 | 3.5 |
| 20 | do | 20 x 0.07 | 0.5 | 30 | 120 | 2.9 | 2.5 | 0.5 | 1.2 | 2.1 | 1.1 | >3.3 | 3.2 | |
| 21 | do | 20 x 0.07 | 1 | 10 | 120 | 2.9 | 2.9 | 1.2 | 0.5 | 1.3 | 3.1 | 3.2 | 3.2 | |
| 22 | do | 20 x 0.07 | 2 | 10 | 120 | 3.0 | 2.8 | 0.8 | 0.3 | 2.3 | 3.1 | 3.2 | 2.9 | |

NOTE.—Sign > stays to indicate that at the specified value there occurred a breakage of the compound.

TABLE 3

Adhesion between sheets of ethylene-propylene copolymers with the interposition of polypropylene Adhesion values determined according to ASTM D413-39 rules (kg./cm.)

| Test No. | Interposed material Type | Coupling conditions Size in mm. | Pressure in kg./cm.² | Time in sec. | Temperature in °C. | Untreated sample | 1 hr. at 50° C. in an oven drawing at 50° C. | 1 hr. at 100° C. in an oven drawing at 100° C. | 2 days at 100° C. in an oven Drawing at 100° C. | 2 days at 100° C. in an oven Drawing at 23° C. | 2 days at 100° C. in H₂O Drawing at 100° C. | 2 days at 100° C. in H₂O Drawing at 23° C. | 5 days in H₂O at 23° C. | 1 hr. at −30° C. drawing at −30° C. |
|---|---|---|---|---|---|---|---|---|---|---|---|---|---|---|
| 23 | Polypropylene | 20 x 0.05 | 0.5 | 10 | 175 | >2.4 | >1.5 | >1.8 | >2.1 | >2.1 | >2.1 | >2.0 | >2.3 | >5.0 |
| 24 | do | 20 x 0.05 | 1 | 10 | 175 | 3.1 | 2.7 | 2.7 | 2.6 | 3.1 | 2.6 | 3.0 | 3.0 | |
| 25 | do | 20 x 0.05 | 2 | 10 | 175 | 3.2 | 2.7 | 2.4 | 2.3 | 2.7 | 2.7 | 3.2 | 3.6 | 5.0 |
| 26 | do | 20 x 0.1 | 0.5 | 10 | 175 | 3.1 | >2.8 | 2.7 | >2.7 | >2.7 | >3 | >3.1 | >3.4 | |
| 27 | do | 20 x 0.1 | 1 | 10 | 175 | 3.2 | 3.0 | 2.7 | >3.0 | 3.3 | 2.6 | 3.1 | 3.2 | |
| 28 | do | 20 x 0.1 | 2 | 10 | 175 | >3.0 | >2.2 | >2.5 | >2.1 | >2.7 | >2.6 | >2.9 | >2.9 | |
| 29 | do | 20 x 0.07 | 0.5 | 10 | 175 | 3.5 | 3.0 | 3.1 | 3.0 | 3.1 | 3.1 | 3.2 | 3.5 | 5.25 |
| 30 | do | 20 x 0.07 | 0.5 | 20 | 175 | >3.3 | >3.0 | >0.25 | >3.0 | >3.3 | >3.1 | >3.2 | >3.4 | |
| 31 | do | 20 x 0.07 | 0.5 | 30 | 175 | 3.3 | 3.2 | >3.1 | >3 | >3.4 | >3.3 | >3.3 | >3.5 | |
| 32 | do | 20 x 0.07 | 1 | 10 | 175 | 3.4 | 3.2 | 3.1 | 3.2 | 3.2 | 2.9 | 3.1 | 3.3 | |
| 33 | do | 20 x 0.07 | 2 | 10 | 175 | 3.4 | 2.9 | 2.7 | 3.2 | 3.3 | 2.9 | 3.1 | 3.3 | |

NOTE.—Sign > stays to indicate that at the specified value there occurred a breakage of the compound.

TABLE 4

Adhesion between sheets of ethylene-propylene copolymers with interposition of copolymers ethylene-propylene heteroblocks Adhesion values determined according to ASTM D423-39 rules in kg./cm.

| Test No. | Interposed material Type | Coupling conditions Size in mm. | Pressure in kg./cm.² | Time in sec. | Temperature in °C. | Untreated sample | 1 hr. at 50° C. in an oven drawing at 50° C. | 1 hr. at 100° C. in an oven drawing at 100° C. | 2 days at 100° C. in an oven Drawing at 100° C. | 2 days at 100° C. in an oven Drawing at 23° C. | 2 days at 100° C. in H₂O Drawing at 100° C. | 2 days at 100° C. in H₂O Drawing at 23° C. | 5 days in H₂O at 23° C. | 1 hr. at −30° C. drawing at −30° C. |
|---|---|---|---|---|---|---|---|---|---|---|---|---|---|---|
| 34 | Copolymer with ethylene-propylene heteroblocks | 20 x 0.1 | 0.5 | 10 | 178 | 3.1 | 2.7 | 2.2 | 2.2 | 3.1 | 3.0 | 3.3 | 3.3 | |
| 35 | do | 20 x 0.1 | 1 | 10 | 178 | 2.7 | 2.6 | 2.8 | 2.1 | 2.8 | 2.9 | 3.4 | 3.5 | |
| 36 | do | 20 x 0.1 | 2 | 10 | 178 | 2.9 | 2.7 | 3.1 | 2.8 | 2.9 | 3.3 | 3.0 | 3.2 | |
| 37 | do | 20 x 0.07 | 0.5 | 10 | 178 | 3.2 | 2.7 | 2.8 | 2.5 | 3.1 | 3.4 | 3.1 | 3.2 | 5.7 |
| 38 | do | 20 x 0.07 | 0.5 | 20 | 178 | 3.2 | 3.0 | 1.0 | 2.6 | 3.1 | 3.3 | 2.4 | 3.1 | |
| 39 | do | 20 x 0.07 | 0.5 | 30 | 178 | 3.0 | 2.9 | 3.1 | 2.7 | 2.9 | 3.3 | 2.3 | 3.2 | |
| 40 | do | 20 x 0.07 | 1 | 10 | 178 | 3.0 | 2.8 | 2.3 | 2.3 | 2.9 | 3.0 | 3.1 | 3.2 | |
| 41 | do | 20 x 0.07 | 2 | 10 | 178 | 3.2 | 2.6 | 2.1 | 2.5 | 3.0 | 3.1 | 3.3 | 3.0 | |
| 42 | do | 20 x 0.05 | 0.5 | 10 | 178 | 2.8 | 2.4 | 2.0 | 2.0 | 2.7 | 1.8 | 2.5 | 2.3 | |
| 43 | do | 20 x 0.05 | 1 | 10 | 178 | 2.4 | 2.3 | 2.7 | 2.7 | 2.5 | 2.5 | 2.4 | 2.7 | |
| 44 | do | 20 x 0.05 | 2 | 10 | 178 | 2.8 | 2.8 | 2.7 | 2.7 | 2.9 | 2.06 | 2.4 | 3.1 | |

TABLE 5

Adhesion between ethylene-propylene-diene terpolymer sheets with interposed plastomers without or with polar substituent groups and reactive groups

| | Coupling conditions | | | | | Adhesion values expressed in kg./cm. according to ASTM D413-39 rules | | | | | | |
|---|---|---|---|---|---|---|---|---|---|---|---|---|
| | Interposed material | | | | | | 1 hr. at 50° C. in an oven drawing at 50° C. | 1 hr. at 100° C. in an oven drawing at 100° C. | 2 days at 100° C. in an oven | | 2 days at 100° C. in H$_2$O | 5 days in H$_2$O at 23° C. | 1 hr. at −30° C. drawing at −30° C. |
| Test No. | Type | Size in mm. | Pressure in kg./cm.$^2$ | Time in sec. | Temperature in °C. | Untreated | | | Drawing at 100° C. | Drawing at 23° C. | Drawing at 100° C. | Drawing at 23° C. | | |
| 45 | Ethylene-propylene copolym. w. heteroblocks | 20 x 0.1 | 2 | 30 | 178 | 2.2 | 2.2 | >1.0 | 0.9 | 2.0 | 1.7 | 2.5 | 2.4 | 5.5 |
| 46 | Polypropylene.[b] | 20 x 0.1 | 2 | 30 | 175 | | | | | | | | | |
| 47 | H.d. polyethylene | 20 x 0.1 | 2 | 30 | 135 | 2.7 | 1.7 | 0 | 0.8 | 1.6 | 0.3 | 2.0 | 2.5 | |
| 48 | Polypropylene[a] | 20 x 0.1 | 2 | 30 | 178 | 3.1 | 1.8 | 2.7 | 1.3 | 1.5 | 2.5 | 2.2 | 3.0 | 5.0 |
| 49 | Rigid PvC.[a] | 20 x 0.1 | 2 | 30 | 130 | 2.0 | 2.0 | >0.7 | >0.3 | 2.0 | 1.4 | 2.3 | 2.8 | 4.8 |
| 50 | Polystyrene[a] | 20 x 0.1 | 2 | 30 | 130 | | | Cannot be defined because adhesion too low | | | | | | |
| 51 | Nylon[a] | 20 x 0.1 | 2 | 30 | 180 | | | Cannot be defined because adhesion too low | | | | | | |

[a] Smooth surfaces of terpolymer sheet.
[b] Knurled surfaces of the terpolymer sheet.
[c] Stiffened specimen.

TABLE 6

Adhesion between sheets based on butyl rubber with interposed plastomers

| | Coupling conditions | | | | | Adhesion values determined according to ASTM D413-39 | | |
|---|---|---|---|---|---|---|---|---|
| | Interposed material | | | | | | 2 days at 100° C. in a stove drawing at 100° C. | 2 days at 100° C. in H$_2$O drawing at 100° C. |
| Test No. | Type | Dimensions in mm. | Pressure, kg./cm.$^2$ | Duration, sec. | Temperature, °C. | Untreated | | |
| 52 | H.d. polyethylene | 20 x 0.05 | 0.5 | 20 | 135 | 4.0 | 1.9 | 2.1 |
| 53 | L.d. polyethylene | 20 x 0.05 | 0.5 | 20 | 120 | 3.2 | 1.5 | 2.5 |
| 54 | Polypropylene | 20 x 0.05 | 0.5 | 20 | 175 | 4.2 | 3.0 | 3.3 |
| 55 | Copolymers with propylene-ethylene heteroblocks | 20 x 0.05 | 0.5 | 20 | 178 | 4.0 | 1.6 | 3.8 |

TABLE 7

Adhesion between butyl rubber sheets and sheets of ethylene-propylene-diene terpolymers with interposed plastomers

| | | Coupling conditions | | | | Adhesion values expressed in kg./cm. determined according to ASTM D413-39 | | |
|---|---|---|---|---|---|---|---|---|
| | Interposed material | | | | | | | |
| Test No. | Type | Dimensions in mm. | Pressure, kg./cm.² | Duration, tion sec. | Temperature, °C. | Untreated | 2 days at 100° C. in stove drawing at 100° C. | 2 days at 100° C. in H₂O drawing at 100° C. |
| 56 | H.d. polyethylene | 20 x 0.05 | 0.5 | 20 | 135 | 3.1 | 2.2 | 2.3 |
| 57 | L.d polyethylene | 20 x 0.05 | 0.5 | 20 | 120 | 2.5 | 1.1 | 2.5 |
| 58 | Polypropylene | 20 x 0.05 | 0.5 | 20 | 175 | 3.5 | 2.8 | 3.2 |
| 59 | Copolymer with propylene-ethylene heteroblocks. | 20 x 0.05 | 0.5 | 20 | 178 | 3.2 | 2.5 | 3.2 |

What is claimed is:

1. Process for adhering together layers or formed articles of vulcanized elastomeric copolymers of 20 to 80 mol percent ethylene with propylene or butene-1 and 0 to 20 percent of a cyclic or acyclic polyene, characterized in that
   1. between the surfaces to be adhered together interposing a layer of polymer of ethylene, propylene or butene, in amount of 2 to 20 milligrams of polymer per square centimeter of surface,
   2. coupling said surfaces together by placing them between two pressing surfaces at a pressure from 0.2 to 4 Kg/sq.cm.,
   3. heating said layers while they are under pressure, at temperature sufficient to obtain the softening of the interposed polymer (1) of between 20° C below to 30° C above the melting point of said plastomer, and
   4. cooling said coupled layers under pressure.

2. Process according to claim 1, wherein the plastomeric layer to be interposed is previously welded under heating and compression to at least one of the elastomeric layers to be caused to adhere.

3. Process according to claim 1, characterized in that the vulcanized elastomeric copolymers are amorphous ethylene-propylene copolymers or ethylene-butene-1 copolymers, having a molecular weight comprised between 50.000 and 800.000, and a contents in combined monomeric units of ethylene of from 20 percent to 80 percent in moles.

4. Process according to claim 1, characterized in that the elastomeric terpolymers are based on ethylene, propylene or butene, and on a diene chosen out of a group comprising dicyclopentadiene, cyclooctadiene, 1,4-hexadiene, 6-methyl-4,7,8,9-tetrahydroindene, and ethylidene-norbornene, and that they have a molecular weight comprised between 60.000 and 800.000 and that they contain from 20 percent to 80 percent in moles of ethylene and from 0.1 to 20 percent in moles of diene.

5. A process of claim 1 wherein the adhering layer is selected from the group consisting of polypropylene essentially consisting of isotactic macromolecules having a density of from 0.902 to 0.906 g/cc, of high-density polyethylene (0.941 to 0.965 g/cc), of medium-density polyethylene (0.926–0.940 g/cc), of low density polyethylene (0.910–0.925 g/cc), of crystalline polybutene with a density of from 0.908 to 0.916 g/cc and of copolymers with heteroblocks of propylene with ethylene or butene.

6. Process according to claim 5, characterized in that the copolymers with heteroblocks ethylene-propylene are composed of blocks of monomeric units of ethylene alternated with blocks with an isotactic structure of monomeric units of propylene and/or butene, having a density of from 0,896 to 0,899 g/cc.

7. A composite article comprising vulcanized elastomeric copolymers of 20 to 80 mols ethylene and at least one other alpha-olefin adhered together solely with a layer in amount of 2 to 20 milligrams of polymer/sq.cm. of surface of a polymer of ethylene, propylene or butene.

* * * * *